United States Patent [19]

Holtz

[11] 4,062,565
[45] Dec. 13, 1977

[54] COLLAPSIBLE BAGGAGE CART

[76] Inventor: Gilbert J. Holtz, 182 Tibbetts Road, Yonkers, N.Y. 10705

[21] Appl. No.: 737,202

[22] Filed: Nov. 1, 1976

[51] Int. Cl.² .............................................. B62B 1/12
[52] U.S. Cl. .............................. 280/655; 280/47.29; 280/47.37 R
[58] Field of Search ........ 280/655, 654, 652, 47.13 R, 280/47.27, 47.29, 47.37 R

[56] References Cited

U.S. PATENT DOCUMENTS

| 230,676 | 8/1880 | Taylor | 280/47.37 R |
| 3,142,087 | 7/1964 | Yokers | 280/47.37 R X |
| 3,241,852 | 3/1966 | Muller et al. | 280/47.29 X |
| 3,947,054 | 3/1976 | Hall | 280/654 |

FOREIGN PATENT DOCUMENTS

| 1,509,040 | 1/1968 | France | 280/655 |
| 2,286,040 | 4/1976 | France | 280/654 |

Primary Examiner—Joseph F. Peters, Jr.
Assistant Examiner—Michael J. Forman
Attorney, Agent, or Firm—Bauer, Amer & King

[57] ABSTRACT

A collapsible cart for use with baggage or the like and having a main frame with a handle connected thereto that is readily inwardly deflected to permit pivotal movement between a locked position in which the cart is operational to a collapsed position. The cart further includes a lower frame, auxiliary frame and a linkage for movement relative to the main frame.

6 Claims, 5 Drawing Figures

COLLAPSIBLE BAGGAGE CART

BACKGROUND OF THE INVENTION

The present invention relates to a cart, and more particularly to a collapsible cart ideally suited for carrying baggage or the like.

A variety of types and styles of collapsible baggage carts have been previously disclosed, and several of these carts are presently on the market. In general, collapsible baggage carts are designed to be folded into a relatively small size, and unfolded into an open position in which the handle extends vertically and is easily gripped by the user of the cart. The cart also includes a main frame from which the handle is adjustable, as well as a lower or support frame on which the baggage is positioned as the cart is wheeled along on a supporting surface. The collapsible cart generally further includes an auxiliary frame connected to the lower frame for movement therewith between respective closed and open positions.

The present invention improves upon the design and construction of the prior art carts by the utilization of a handle that is readily movable in releasable fashion between a stable position in which the cart is ready for use, to a collapsed position in which the handle and the main frame are relatively positionable in substantially contiguous planes. The dimensional relationship of the arms forming the handle permits the necessary adjustments between respective positions in a most convenient manner.

By providing the improvements in the present invention referred to above, and others hereinafter discussed in detail, a collapsible baggage cart having these novel features is presently being marketed with most favorable acceptance. It must be appreciated that baggage carts of the present form are generally purchased by older individuals who cannot carry their bags over a great distance, which is generally required today at airport terminals. Accordingly, by providing the collapsible cart of the present invention, which provides additional features making its assembly and disassembly more easily accomplished, the market acceptance of the cart has thus resulted.

OBJECTS OF THE INVENTION

An object of the present invention is to provide a cart that is readily collapsible and ideally suited for carrying baggage or the like.

Another object of the present invention is to provide a lightweight cart that is of sturdy construction and in which a handle that is easily adjusted is provided.

Other objects and advantages of the present invention will become apparent as the disclosure proceeds.

SUMMARY OF THE INVENTION

A cart for baggage comprising a main frame including spaced apart vertically extending elements, with an upper cross-element for connecting the elements at the upper end thereof, and a lower cross-element for connecting the elements at the lower end thereof. Laterally spaced wheels are rotatably mounted at the lower end of the main frame outwardly of each of the elements for movement of the cart along a supporting surface.

Handle means adapted to be gripped by the user of the cart and including a pair of spaced apart elongated resilient arms, with each of the arms terminating in a free end is provided. The arms are adapted to have the free end of each arm inwardly disposed for pivotal movement relative to the main frame.

Mounting means is provided for obtaining releasable interlocking relationship of the handle means in either a stable position extending upwardly from said main frame in readiness for use or in a collapsed position in which the handle means and the main frame are relatively positionable in substantially contiguous planes. The mounting means comprises a pair of vertically oriented members inwardly disposed of each of the elements and connected to the upper and lower cross-elements. Each of the members terminates in an inwardly disposed catch extending above the upper cross-element.

A first cross-member is mounted between the members below the upper cross-element, with the free end of each arm pivotally mounted on the first cross-member, such that in the stable position each arm extends vertically between a respective catch and the upper cross-element to prevent pivotal movement, and inwardly positioning of each of the arms on the first cross-member beyond the catches permits the handle means to be pivotally moved to the collapsed position.

A lower frame is articulately connected to the main frame for movement relative thereto between a closed position substantially coplanar with the main frame to an open position where the lower frame projects forwardly from the main frame for supporting baggage thereon. An auxiliary frame is articulately connected to the lower frame for movement relative thereto between a closed position wherein the auxiliary frame projects downwardly from the lower frame and being engageable with the supporting surface.

Linkage means is utilized for simultaneously moving the auxiliary frame in unison with the lower frame between the open and closed positions thereof. The linkage means comprises a second cross-member mounted between the members and below the first cross-member, and a link member pivotally mounted at one end thereof to the second cross-member, and at the opposite end thereof pivotally mounted to the auxiliary frame, such that pivotal movement of the lower frame relative to the main frame is obtained.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE DRAWINGS

Figures 1, 2, 4:
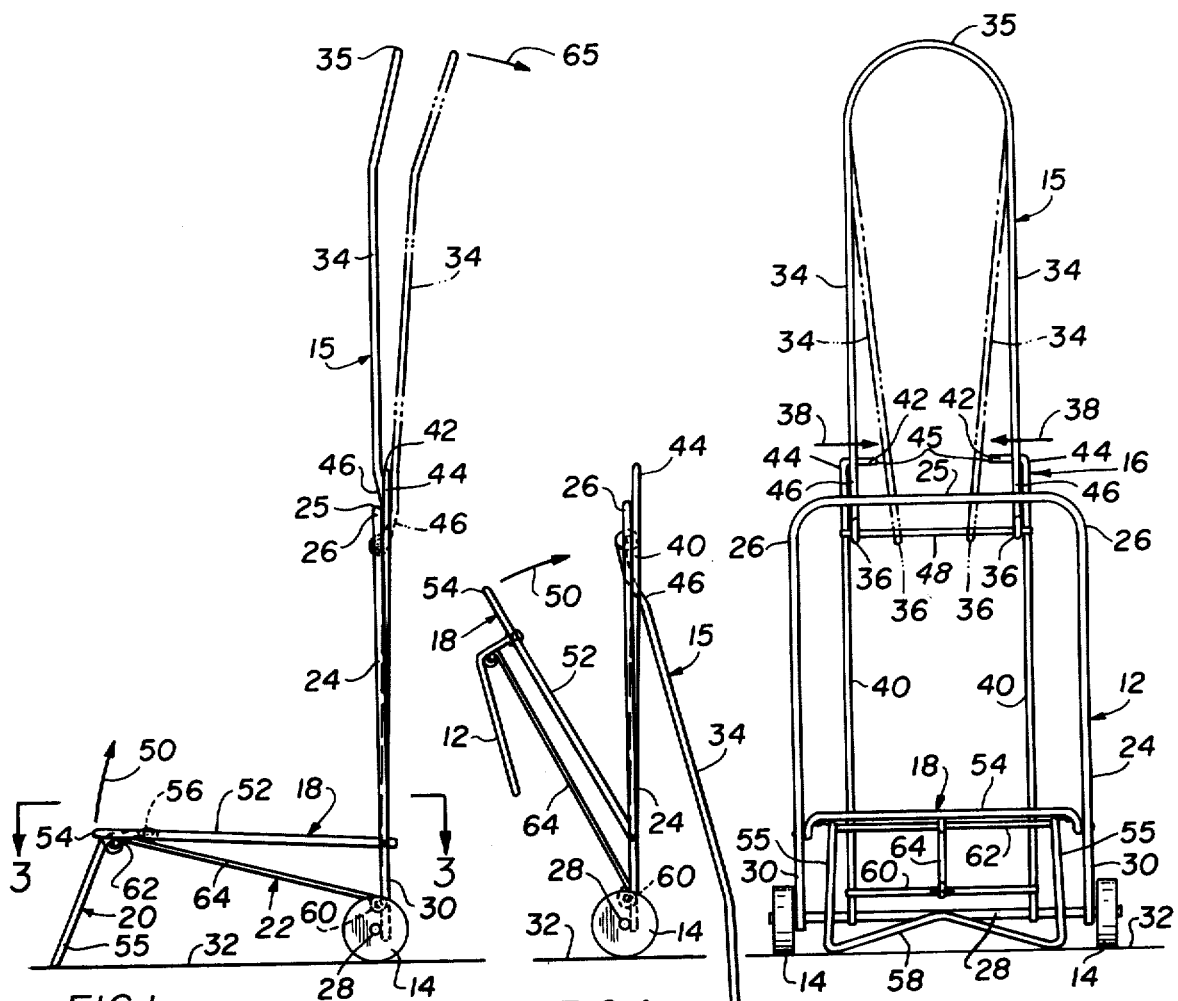
FIG. 1 is a side plan view of the cart in accordance with the present invention.
FIG. 2 is a front plan view of the cart illustrated in FIG. 1.
FIG. 4 is a side plan view illustrating the movement of the respective portions of the cart when being collapsed.

Referring to the drawings, there is illustrated in FIGS. 1 through 5 a cart 10 for handling of baggage or the like. The cart 10 is comprised of a main frame 12 having laterally spaced wheels 14 mounted at the lower end of the main frame 12, with a handle or handle means 15 operatively associated with the main frame 12. Mounting means 16 is provided in order to obtain the interconnected relationship between the handle 15 and the main frame 12. In addition, the cart 10 is further comprised of a lower frame 18 on which the baggage would rest when the cart is in the open position illustrated in FIGS. 1 through 3.

Figures 3, 5:
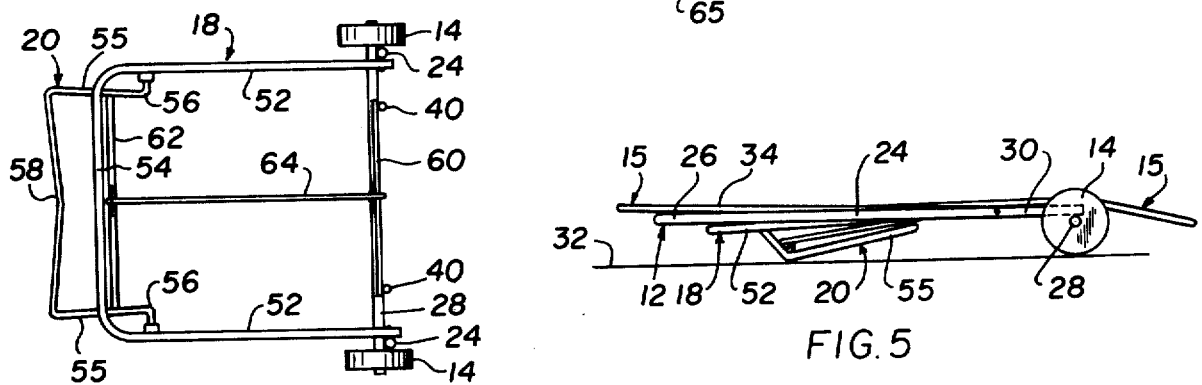
FIG. 3 is a sectional view of the cart illustrated in FIG. 1, taken along line 3—3 of FIG. 1.
FIG. 5 is a side plan view of the cart in its fully collapsed position.

An auxiliary frame 20 is articulately connected to the lower frame 18 for movement therewith between the open position of FIG. 1 to the closed or collapsed position of FIG. 5. Linkage means 22 is utilized for simultaneously moving the auxiliary frame 20 in unison with the lower frame 18 between their respective open and closed positions.

The main frame 12 includes a pair of spaced apart vertically extending elements 24 with an upper cross-element 25 connecting the elements 24 at the upper end 26 thereof. A lower cross-element 28 connects the elements 24 at the lower end 30 thereof. The lower cross-element 28 may extend beyond each element 24 to have the wheels 14 rotatably mounted in laterally spaced relationship thereon. This permits for movement of the cart 10 along a supporting surface designated by numeral 32.

The handle 15 may be formed by a pair of spaced apart resilient elongated arms 34 that are joined together at one end thereof by a middle section 35. The arms 34 and middle section 35 may be integrally formed with each other from a metallic rod. Each of the arms 34 terminating in a free end 36. As illustrated in FIG. 2, the resilient nature of the material from which the handle 15 is fabricated permits the arms to be temporarily moved inwardly in the direction of arrows 38. This deflection, which may approximate 1 to 3 inches, is easily accomplished with a minimum amount of force.

Furthermore, the lateral spacing between the arms 34 may be dimensioned so as to conveniently be disposed into the position illustrated by the phantom lines in FIG. 2. When the dimension between the arms 34 approximates 6 inches, it is possible for some people to use one hand for compressing the arms 34 in the direction of arrows 38 for the necessary period of time. This dimension of approximately 6 inches also facilitates convenient use of two hands to accomplish the same end result.

The mounting means 16 for obtaining releasable interlocking relationship of the handle 15 in a stable position extending upwardly from the main frame 12 includes a pair of vertically oriented members 40. The vertically oriented members 40, are so designed so as to permit movement of the handle 15 from the stable position in which the cart 10 is in readiness for use, to a collapsed position in which the handle 15 and the main frame 12 are relatively positionable in substantially contiguous planes, as illustrated in FIG. 5.

Each of the vertically oriented members 40 are connected to the upper cross-element 25 and lower cross-element 28 as by welding, etc. Each member 40 is inwardly disposed of the elements 24 and may extend in substantially parallel spaced relationship thereto. Each member 40 terminating in an inwardly disposed catch 42 at one end 44 thereof. The catch 42 extends above the upper cross-element 25, and terminates in a distal end 45.

A first cross-member 48 is mounted between the members 40 and below the upper cross-element 25. The free end 36 of each arm 34 is pivotally mounted on the first cross-member 46. The pivotal mounting may be obtained by a loop at the free end 36. In the stable position of the cart 10 illustrated in FIGS. 1 and 2, each arm 34 extends vertically between a respective catch 42 and upper cross-element 25 to prevent pivotal movement. The inwardly positionment of each of the arms 34 on the first cross-member 48 beyond the distal end 45 of the catches 42 permits the handle 15 to be pivotally moved to the collapsed position.

As illustrated in FIG. 2, the upper cross-element 25 and first cross-member 48 are each disposed on the same side of the members 40. To accommodate the arms 34, there is provided adjacent each free end a contoured section 46, as illustrated in FIG. 1. This bend in each arm 34 permits the positionment illustrated in FIG. 2 to obtain the interlocking relationship in the stable position.

To obtain the lateral displacement of the free ends 36, each arm 34 is independently movable transversely on the first cross-member 46 for inwardly positioning same beyond the catches 42 for pivotally moving the handle means relative to the main frame 12. Due to the resilient nature of the arms 34, they will automatically return to their normal position after being released from their inwardly disposed position. Furthermore, to add additional rigidity to the cart 10, the spacing between the members 40 is such that the arms 34 are biased outwardly against the members 40 in the stable position illustrated.

The lower frame 18 is articulately connected to the main frame 12 for movement relative thereto between the open position, to a closed position in the direction of arrow 50. In the closed position the lower frame 18 is substantially coplanar with the main frame 12. In the open position the lower frame 18 projects forwardly from the main frame 12 for supporting the baggage thereon. The lower frame includes a pair of legs 52 pivotally coupled at one end to the elements 24. A frame body 54 is coupled across th legs at the opposite end of each leg 52.

The auxiliary frame 20 is similarly articulately connected to the lower frame 18 for movement relative thereto between the respective positions. The auxiliary frame 20 projects downwardly from the lower frame 18 and being engageable with the supporting surface 32. The auxiliary frame 20 may include a pair of extensions 55. Each extension 55 is pivotally coupled at one end 56 to a respective one of the legs 52. An extension member 58 is coupled across the extension 55 at the opposite end thereof.

To obtain the simultaneous movement of the auxiliary frame 20 with the lower frame 18, the linkage means 22 is provided. The linkage means 22 includes a second cross-member 60 mounted between the members 40 and below the first cross-member 46, and may be mounted on the same side as the first cross-member 46. A cross-link member 62 is coupled across the extensions 55. A link member 64 is pivotally mounted at one end to the second cross-member 60, and at the opposite end thereof is pivotally mounted to the cross-link member 62. In this manner pivotal movement of the lower frame 18 and auxiliary frame 20 are simultaneously obtained relative to the main frame 12.

In this manner the cart 10 can be readily brought from the stable position of FIG. 1 to the position of FIG. 4 and in turn the finally collapsed position of FIG. 5. Upon movement of the arms 34 to the phantom position illustrated in FIG. 2, the handle 15 is free to be rotated in the direction of arrow 65. After this is accomplished, the main frame 12, lower frame 18, and auxiliary frame 20 may be collapsed to the position illustrated in FIG. 5.

Accordingly, the above cart may be conveniently utilized for baggage and other applications in which space is at a premium and the user wishes to assemble same with a minimum of effort. The respective sections of the cart may be formed from steel rod and welded together in a conventional manner to provide the necessary strength.

Although an illustrative embodiment of the invention has been described in detail herein with reference to the accompanying drawings, it is to be understood that the invention is not limited to the precise embodiment and that various changes and modifications may be effected therein without departing from the scope or spirit of the invention.

What is claimed is:

1. A cart for baggage, comprising
   A. a main frame including
      1. spaced apart vertically extending elements,
      2. an upper cross-element for connecting said elements at the upper end thereof,
      3. a lower cross-element for connecting said elements at the lower end thereof,
   B. laterally spaced wheels rotatably mounted at the lower end of said main frame outwardly of each of said vertically extending elements for movement of the cart along a supporting surface,
   C. a handle adapted to be gripped by the user of the cart, said handle including a pair of spaced apart elongated resilient arms, each of said arms terminating in a free end, said arms adapted to have said free end of each said arm inwardly disposed,
   D. mounting means for obtaining releasable interlocking relationship of said handle in either a stable position extending upwardly from said main frame in readiness for use or in a collapsed position in which said handle and said main frame are relatively positionable in substantially contiguous planes, said mounting means comprising
      1. a pair of vertically oriented members inwardly disposed of each of said elements and connected to said upper and lower cross-elements,
      2. each of said members terminating in an inwardly disposed catch extending above said upper cross-element,
      3. a first cross-member mounted between said members below said upper cross-element, said free end of each said arms pivotally mounted on said first cross-member, such that in said stable position each said arm extends vertically between a respective catch and said upper cross-element to prevent pivotal movement, and inwardly positioning of each of said arms on said first cross-member beyond said catches permits said handle to be pivotally moved to said collapsed position,
   E. a lower frame articulately connected to said main frame for movement relative thereto between a closed position substantially coplanar with said main frame to an open position where said lower frame projects forwardly from said main frame for supporting baggage thereon,
   F. an auxiliary frame articulately connected to said lower frame for movement relative thereto between a closed position wherein said auxiliary frame projects downwardly from said lower frame and being engageable with the supporting surface, and
   G. linkage means for simultaneously moving said auxiliary frame in unison with said lower frame between said open and closed positions.

2. A cart as in claim 1, wherein said linkage means comprises
   a. a second cross-member mounted between said vertically oriented members and below said first cross-member, and
   b. a link-member pivotally mounted at one end thereof to said second cross-member, and at the opposite end thereof pivotally mounted to said auxiliary frame, such that pivotal movement of said lower frame relative to said main frame is obtained.

3. A cart as in claim 2, wherein said free end of each said arms is independently movable transversely on said first cross-member for inwardly positioning same beyond said catches for pivotally moving said handle relative to said main frame.

4. A cart as in claim 1, wherein said arms automatically return to their normal position after being released from said inwardly disposed position.

5. A cart as in claim 4, wherein said arms are horizontally spaced from each other a distance to be manually gripped by one hand of the user for movement to said inwardly disposed position.

6. A cart as in claim 1, wherein each said arm is biased outwardly against one of said members in said stable position.

* * * * *